No. 670,542. Patented Mar. 26, 1901.
J. ST. L. McGINN.
ACETYLENE GAS GENERATOR.
(Application filed Apr. 1, 1898. Renewed Aug. 23, 1900.)
(No Model.) 5 Sheets—Sheet 1.

FIG.1.

WITNESSES:
INVENTOR
BY
ATTORNEYS.

No. 670,542. Patented Mar. 26, 1901.
J. ST. L. McGINN.
ACETYLENE GAS GENERATOR.
(Application filed Apr. 1, 1898. Renewed Aug. 23, 1900.)

(No Model.) 5 Sheets—Sheet 4.

WITNESSES:
Donn Twitchell

INVENTOR
J. St. L. McGinn
BY
ATTORNEYS.

UNITED STATES PATENT OFFICE.

JOHN ST. LEGER McGINN, OF WINNIPEG, CANADA, ASSIGNOR TO CHARLES CUSHING HOLLAND, (TRUSTEE,) OF MONTREAL, CANADA.

ACETYLENE-GAS GENERATOR.

SPECIFICATION forming part of Letters Patent No. 670,542, dated March 26, 1901.

Application filed April 1, 1898. Renewed August 23, 1900. Serial No. 27,822. (No model.)

*To all whom it may concern:*

Be it known that I, JOHN ST. LEGER MC-GINN, of Winnipeg, in the Province of Manitoba and Dominion of Canada, have invented a new and Improved Acetylene-Gas Generator, of which the following is a full, clear, and exact description.

The object of the invention is to provide a new and improved acetylene-gas generator so arranged as to govern the generation of the gas automatically and according to the amount consumed.

The invention consists of novel features and parts and combinations of the same, as will be described hereinafter and then pointed out in the claims.

Reference is to be had to the accompanying drawings, forming a part of this specification, in which similar characters of reference indicate corresponding parts in all the figures.

The improved machine is provided with one, two, or more generators A A' alike in construction and each connected by a pipe B with a gas-holder C of suitable dimensions for receiving and storing the gas produced, said holder being connected by a suitable pipe with the burners at which the gas is to be burned. The water necessary for the generation of gas in the generators A A' is supplied by a water-measuring device D, arranged to supply the generators with measured quantities of water from time to time, according to the amount of gas withdrawn from the holder C. The measuring device D is connected by a pipe E with a suitable source of water-supply, and the detail construction of the said device will be described more fully hereinafter.

Each of the generators A A' is provided with a casing $A^2$, supported on a cover $A^3$, carried by a bracket on the holder C, said casing being provided with an annular flange $A^4$, engaged by a clamp $A^5$, extending over the cover $A^3$, and engaged by a clamping-screw $A^6$, resting on the top of the cover $A^3$, to hold the cover in position on the casing. By loosening the screw $A^6$ the clamp $A^5$ releases the cover $A^3$ from the casing (see generator A' in Fig. 1) to permit of removing the casing for emptying the same of water and refilling the cups F, adapted to be supported in the casing and arranged to contain calcium carbid.

Figure 1:
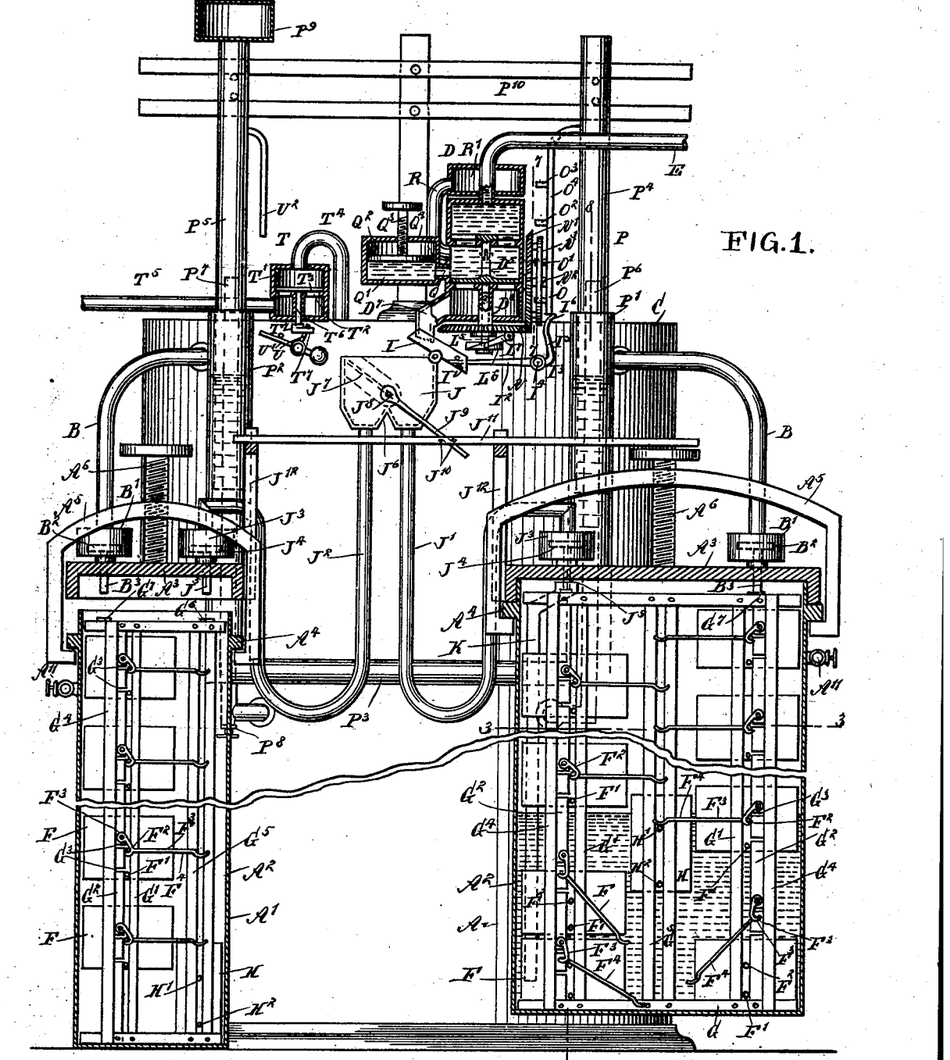
Figure 1 is a sectional side elevation of the improvement with one of the generators out of action.
Figure 2:
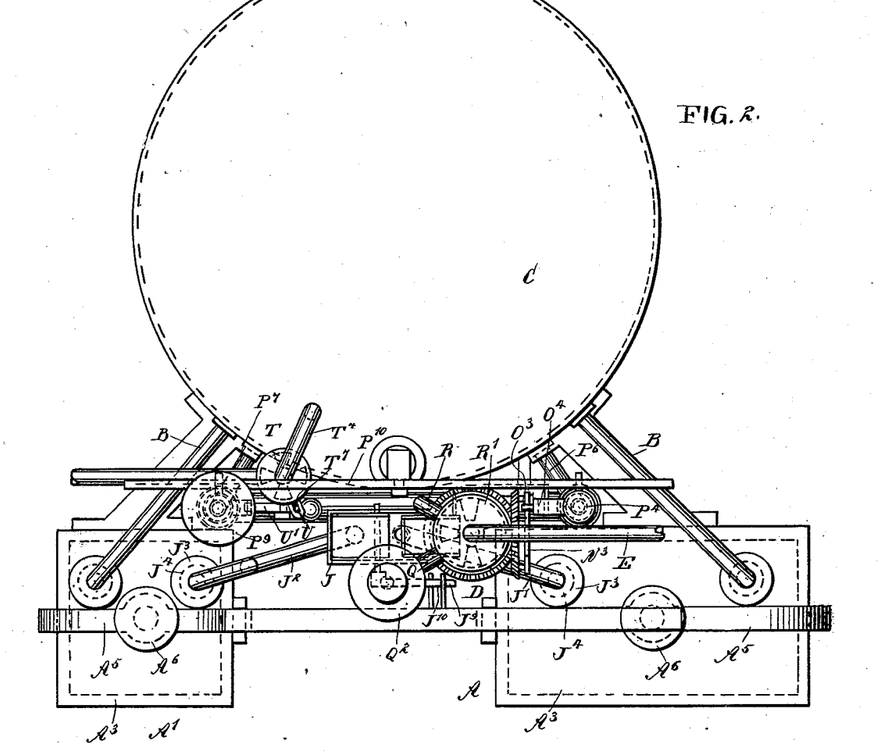
Fig. 2 is a plan view of the same.

Each of the casings $A^2$ is provided with a suitable removable framework G for supporting the calcium-carbid cups or boxes F one above the other in one, two, or more tiers, as will be readily understood by reference to Fig. 1—that is, the generator A has a frame with one tier of cups and the generator A' is provided with two tiers of cups, the action, however, being the same in each case. The cups or boxes F are arranged above each other and are supported independently of one another and are successively released and pass downward into the water accumulating in the casing $A^2$, so that the calcium carbid is submerged in the water and the gas is generated in the usual manner, the gas rising through the water to cool off and to then pass through the pipe B to the holder C.

Figure 3:
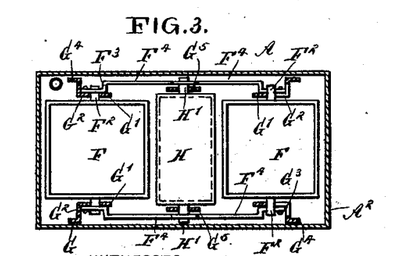
Fig. 3 is a sectional plan view of one of the generators on the line 3 3 of Fig. 1.
Figure 4:
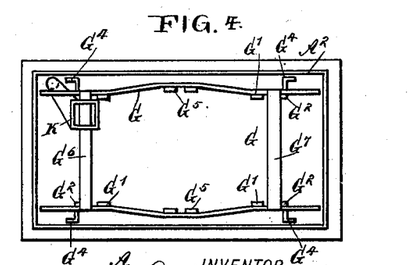
Fig. 4 is a plan view of the same with the cover and the carbid-cups removed.

In order to independently support the boxes F in the frame G and to automatically trip the same successively, I provide the following arrangement: Each of the boxes or cups is provided with two guide-pins $F'$ $F^2$, fitted to slide in a vertical guideway formed by two bars $G'$ $G^2$, secured to the frame G, the bar $G^2$ being provided with sets of slots $G^3$ to allow of introducing the boxes F sidewise through the slots for the pins $F'$ $F^2$ to reach the vertical guideway. The bar $G^2$ projects at the inside of the vertical brace $G^4$ of the frame G to permit the ready introduction of the boxes, as will be readily understood by reference to Fig. 3. The sets of slots $G^3$ are spaced far enough apart to keep the boxes separate, each of the boxes having the uppermost pin $F^2$, engaged at each side by a hook $F^3$, fulcrumed on the guideway-bar $G^2$, and formed with an extension $F^4$, reaching to a guideway $G^5$, carried by the frame G, and containing a float H, adapted to rise and fall in the casing $A^2$. The float H has its guide-pins $H'$ $H^2$ extending through the guideways $G^5$, the uppermost pin being adapted to engage the free end of the extension $F^4$, so that when the water accumulates in the casing $A^2$ and the float rises the said pin $H'$ moves the extension $F^4$ upward to finally swing the hook $F^3$ out of engagement with the pin $F^2$, so that this particular box or cup F is released and slides downward into the water and submerges the calcium carbid for the generation of gas, as previously mentioned. It is evident from the foregoing that the calcium-carbid boxes or cups F are successively released, beginning with the lowermost one, upon the water rising in the casing $A^2$ and carrying the float H upward to trip the boxes, as above mentioned.

In case two tiers of boxes are used, as indicated, in the generator $A'$, then the boxes are so arranged that the extensions $F^4$ of the supporting-hooks reach alternately from the two tiers to the guideways $G^5$, so that the float H in rising releases first a box in one tier, and then a box in the other tier, and then the second box on the first tier, and so on, releasing the boxes alternately from the tiers for the generation of gas.

In order to supply the casing $A^2$ of a generator with measured quantities of water, delivered to the casings at intervals, according to the consumption of the gas withdrawn from the holder C, I provide the following arrangement, special reference being had to Figs. 1, 5, 6, and 7: The water-measuring device D is provided with a casing $D'$, formed with transversely-arranged valve-seats $D^2$ $D^3$, dividing the said casing into an upper compartment $D^4$, connected with the supply-pipe E, a middle compartment $D^5$, and a lower compartment $D^6$, having an outlet $D^7$, discharging into a chute I, pivoted at or near its middle on the upper end of a hopper J, provided in its bottom with two pipes $J'$ $J^2$, leading to the covers $A^3$ of the two generator-casings $A^2$, as is plainly indicated in Fig. 1.

The ends of the pipes $J'$ $J^2$ open into pipes K, extending in the casings $A^2$ to within a short distance of the bottoms thereof, so as to deliver the water to the casings at this point. Each of the pipes $J'$ $J^2$ is provided near its entrance to the cover $A^3$ with a valve-casing $J^3$, containing a valve $J^4$, the stem $J^5$ of which extends through the cover $A^3$ to the inside of the casing to be engaged by a cross-bar $G^6$, carried by the frame G in the corresponding generating-casing $A^2$. Thus when the cover $A^3$ carries the casing $A^2$, as shown at the right in Fig. 1, the valve $J^4$ is lifted off its seat and the water can readily flow from the pipe $J'$ to the pipe K in this casing; but when the casing is disconnected from its cover, as shown at the left in Fig. 1, then the valve $J^4$ in the pipe $J^2$ seats itself in the casing $J^3$ to prevent water from passing down the pipe and from flowing out of the same. Thus when a casing $A^2$ is disconnected from its cover the corresponding pipe $J'$ or $J^2$ is automatically closed at its lower end. A similar arrangement is in each gas-pipe B—that is, the pipe B is provided with a valve-casing $B'$, containing a valve $B^2$, having its stem $B^3$ extending through the cover $A^3$ into the inside of the casing $A^2$ to be engaged by a cross-bar $G^7$, carried by the frame G, to hold the valve normally on its seat. When the casing is disconnected from the cover, the valve $D^2$ closes by its own weight to prevent gas from escaping from the holder by way of the pipe B.

The bottom of the hopper J is provided with a transversely-extending peak-shaped partition $J^6$ for separating the inlets to the pipes $J'$ $J^2$, so that the water passing down the chute I into the hopper J first flows down the pipe $J'$ to the casing $A^2$ of the generator A, and after the said casing is filled with water, as hereinafter more fully described, then the water overflows the partition $J^6$ and passes down the pipe $J^2$ to the other casing $A^2$ of the generator $A'$, so that the latter is now brought into action for generating gas, while the other casing for the generator A may be removed and emptied of the water and of the carbid cups or boxes for replenishing the boxes with new calcium carbid.

In the hopper J is arranged a dividing-wing $J^7$, fulcrumed on a shaft $J^8$, journaled in the sides of the hopper J, and one outer end of the shaft is provided with an arm $J^9$, loosely engaging two pins $J^{10}$ on a rod $J^{11}$, fitted to slide longitudinally in suitable bearings $J^{12}$, carried by the covers $A^3$ of the two generating-casings $A^2$. The rod $J^{11}$, as shown in Fig. 1, extends with one end over the head of the screw $A^6$ for the generator, while the other end is clear of the head of the screw $A^6$ for the generator $A'$. This indicates that the wing $J^7$ is in such a position that the water from the chute I passes to the pipe $J'$ and generator A, and the screw $A^6$ is thus locked in position. Now when the casing $A^2$ for the generator A has been filled with water and the calcium carbid therein has been utilized and the overflow begins from the hopper J into the pipe $J^2$ then the operator shifts the rod $J^{11}$ from the right to the left to impart a swinging motion to the arm $J^9$ and to the wing $J^7$ to move the same into a reverse position to direct the water from the chute I directly to the pipe $J^2$. The screw-rod $A^6$ is then unlocked to permit of removing the casing $A^2$ for the generator A for the purpose previously described.

The valve-seat $D^2$ in the casing $D'$ is formed with apertures normally closed by a valve L, provided with a downwardly-extending stem L', journaled in suitable bearings in the middle of the said seat $D^2$. The lower end of the stem L' is pivotally connected with a stem $L^2$ for a valve $L^3$, operating over the valve-seat $D^3$ and arranged in such a manner relatively to the valve L that when the latter is closed the valve $L^3$ is opened to establish communication between the compartments $D^5$ and $D^6$. A quarter-turn given to the connected valves L and $L^3$ closes the valve $L^3$ upon its seat $D^3$ and opens the valve L from its seat $D^2$ to permit water from the compartment $D^4$ to fill the compartment $D^5$, and at the next quarter-revolution given to the valves the valve L again closes on its seat $D^2$ and the other valve $L^3$ leaves its seat to allow the water to pass from the compartment $D^5$ to the compartment $D^6$ and from the latter to the outlet $D^7$ over the chute I to the hopper J for delivery to the generator A or A'.

The valve $L^3$ is provided at its lower end with a stem $L^4$, mounted to turn in a sleeve $D^8$, connecting the bottom of the casing D' with the seat $D^3$, and the said stem $L^4$ is pivotally connected with a shaft $L^5$, likewise journaled in the said sleeve and carrying at its lower end a ratchet-wheel $L^6$, engaged by a pawl $L^7$, fulcrumed on a bevel gear-wheel N, mounted to rotate loosely on a suitable bearing formed on the lower end of the sleeve $D^8$ below the bottom of the casing D'. The bevel gear-wheel N is in mesh with a bevel gear-wheel N', mounted to turn on a stud $N^2$, carried by the casing D', and the said bevel gear-wheel N' is rigidly connected with a star-wheel $N^3$, preferably formed with four arms, as plainly indicated in Fig. 7. The star-wheel $N^3$ is engaged by pins O O' $O^2$ $O^3$, placed an equal distance apart and one above the other on a rod $O^4$, having an up-and-down motion according to the pressure of the gas in the holder C, the said rod being controlled by a device P, actuated by the pressure from within the holder C.

When the rod $O^4$ is in an uppermost position and the controlling device P causes the rod to move downward at the time the pressure within the holder C is less than required for supplying the burners with the desired amount of gas and it becomes necessary to generate a new charge of gas in the generator A or A', then the downward movement of the rod $O^4$ brings the pin O in engagement with one of the wings of the star-wheel $N^3$ to give the latter a quarter-turn, so that the gear-wheel N' transmits a rotary motion to the gear-wheel N, which by the pawl $L^7$ imparts a quarter-revolution to the ratchet-wheel $L^6$, so that both valves $L^3$ and L are given a quarter-turn to close the valve-seat $D^3$ and to open the valve-seat $D^2$. When this takes place, the middle compartment $D^5$ is filled with water from the compartment $D^4$, and upon farther descent of the rod $O^4$ the second pin O' gives another quarter-turn to the star-wheel $N^3$, so that the valves L $L^3$ are again given a quarter-turn to cut off the compartment $D^5$ from the compartment $D^4$ and to connect the compartment $D^5$ with the compartment $D^6$, so that the water flows from the compartment $D^5$ through the compartment $D^6$ and outlet $D^7$ to the hopper J to deliver a measured quantity of water to the generator A or A'. In case the quantity of water delivered is not sufficient for generating a quantity of gas necessary to bring the pressure in the holder C up to the required amount the rod $O^4$ descends still farther and brings the pins $O^2$ $O^3$ successively in action in the same manner as the pins O O' and for the same purpose—that is, to measure another quantity of water and deliver the same to the generator-casing $A^2$.

When the pressure of gas in the holder C increases, the rod $O^4$ is returned to its former position, and in doing so the pins $O^3$ $O^2$ O' O successively rotate the star-wheel $N^3$; but the valves L $L^3$ now remain stationary, as the pawl $L^7$ simply glides back over the teeth of the ratchet-wheel $L^6$ without turning the latter.

In order to increase the amount of water in the measuring device, I provide the following device: The compartment $D^5$ is connected by a pipe Q with a reservoir Q', containing a movable plunger $Q^2$, held on a screw $Q^3$, screwing in the top $Q^4$ of the reservoir Q'. When the valve L is open and the valve $L^3$ is closed, the water flowing from the compartment $D^4$ into the compartment $D^5$ can also pass through the pipe Q into the reservoir Q' to fill the same up to the movable plunger $Q^2$, and by moving the latter up or down the supply of water needed to fill the said reservoir may be regulated. When the valve L closes and the valve $L^3$ opens, then the water from the compartment $D^5$, as well as that from the reservoir Q', is discharged into the compartment $D^6$ for delivery to the generator-casing $A^2$. An air-pipe R leads from the upper end of the compartment $D^5$ to connect with an air-chamber R' and insure a ready flow of the water from the compartment $D^5$ and reservoir Q' when the valve $L^3$ is opened. The rod $O^4$ in its up-and-down movement also controls the position of the chute I, and for this purpose the latter is provided at its outer end with pins I', engaging the free end of the arm $I^2$ of a bell-crank lever $I^3$, fulcrumed on a stud $I^4$, carried by the holder C. The other arm $I^5$ of the bell-crank lever is provided with a cam end $I^6$, adapted to be engaged by the lower end of the rod $O^4$ upon the descent of the latter to impart a swinging motion to the bell-crank lever and move the chute I into the position shown in Fig. 5, so that the water passing down the outlet $I^7$ is delivered by the said chute I into the hopper J. The rod $O^4$ while in a lowermost position abuts against the cam end $I^6$ to hold the bell-crank lever in this position, and as soon as the rod $O^4$ has moved upward and the lower end has left the cam end $I^6$ then the chute I swings into an outermost position, as shown in Fig. 1, by the combined action of the overbalanced end of the chute and the overbalancing-arm I² of the lever. When the chute I is in this position, any drip-water from the compartment D⁶ is delivered to the chute I at one side of the machine. Consequently this drip-water does not pass to the generator-casing.

The controlling device P is provided with two vertically-disposed pipes P' P², connected with each other at their lower ends by a pipe P³, the pipes being filled with water or other liquid to about the level indicated in Fig. 1. In the pipes P' P² are fitted the pipes P⁴ P⁵, respectively, closed at their upper ends, their lower open ends being immersed in the liquid contained in the pipes P' P². Into the pipes P⁴ P⁵ extend the stand-pipes P⁶ P⁷, connected with the holder C, so that gas can pass from the latter into the said pipes P⁴ P⁵. The pipe P⁷ is provided near its lower end with a valve P⁸ for closing said pipe after a sufficient amount of gas has been admitted to the pipe P⁵, according to the pressure desired to be maintained in the holder C. The pipe P⁴ carries the rod O⁴, previously mentioned, and the upper ends of the pipes P⁴ P⁵ are connected with each other by a double lever P¹⁰, so that the rising of one pipe causes the downward movement of the other, and vice versa. The pipe P⁵ is provided at the top with a reservoir P⁹ to allow of maintaining a large quantity of gas in the pipe P⁵.

When the pressure in the holder C falls below the normal degree desired, then the pressure in the pipe P⁴ decreases correspondingly, while the preponderance of pressure in the pipe P⁵ causes a rising of the said pipe P⁵ in the pipe P², and consequently a swinging motion is given to the lever P¹⁰, so that the pipe P⁴ moves downward correspondingly to the rise of the pipe P⁵. The downward movement of the pipe P⁴ causes the rod O⁴ to move in a like direction for actuating the water-measuring device D, as previously explained, so that water passes to the generators and a new charge of gas is produced to bring the pressure in the holder C up to a normal pressure. An increase of pressure in the holder C causes an increase of pressure in the pipe P⁴, so that the latter returns to its former position—that is, the two pipes again become balanced by reason of the connection of the pipes by the lever P¹⁰ and of the equal pressure in both pipes. In case of an increase of pressure in the holder C beyond that of the normal pressure the pipe P⁴ is caused to move upward, owing to the preponderance of pressure over that in the pipe P⁵, which latter now moves downward and finally actuates a safety device T to allow the surplus of pressure of gas to escape from the holder C.

The safety device T is provided with a casing T', having a valve-seat T² for dividing the casing into an upper and lower compartment, having a valve T³, controlling the valve-seat. The upper compartment is connected by a pipe T⁴ with the holder C, and the lower compartment is provided with a discharge-pipe T⁵. The valve T³ is provided with a stem T⁶, extending through the casing T' to carry at its lower end an arm T⁷, engaged by an arm U of a weighted lever U', adapted to be engaged at its free end by a rod U², carried by the pipe P⁵. When the latter moves downward, as above described, the rod U² finally comes in contact with the lever U' to impart a swinging motion thereto and to cause the arm U to turn the valve T³, so that the latter opens and connects the upper compartment with the lower compartment for the escape of gas from the holder C. When normal pressure is again reached in the holder C, the pipe P⁵ ascends and the lever U' by its weight swings back to its former position and moves the valve T³ shut to cut off communication between the upper and lower compartment in the casing T'.

Figures 8, 9:
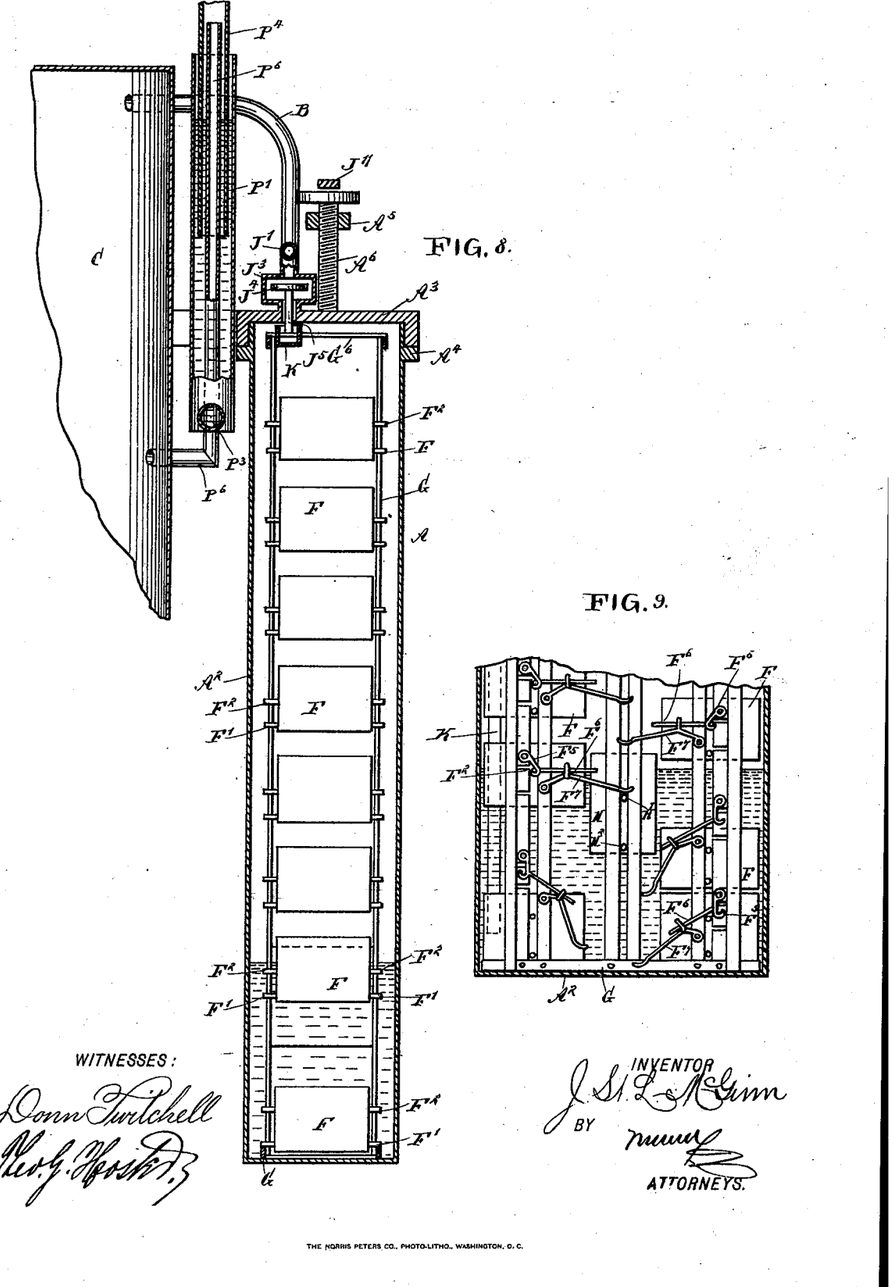
Fig. 8 is a transverse section of the improvement on the line 8 8 of Fig. 1.
Fig. 9 is a sectional side elevation of a modified form of tripping device for the carbid-cups.

The supporting or tripping device for the carbid boxes or cups F may be somewhat varied, as indicated in Fig. 9, in which each of the boxes is supported by a hook F⁵, having its extension F⁶ loosely connected with a lever F⁷, fulcrumed on the frame G and extending with its free end into the path of the pin H' of the float H, so that the upward movement of the latter imparts a swinging motion to the lever F⁷, which by its connection with the extension F⁶ moves the hook F⁵ out of engagement with the pin F² of the cup F to release the latter. Otherwise the arrangement of the casing A² and the open frame G, together with the float H, is the same as described in reference to Fig. 1.

Figures 5, 6, 7:
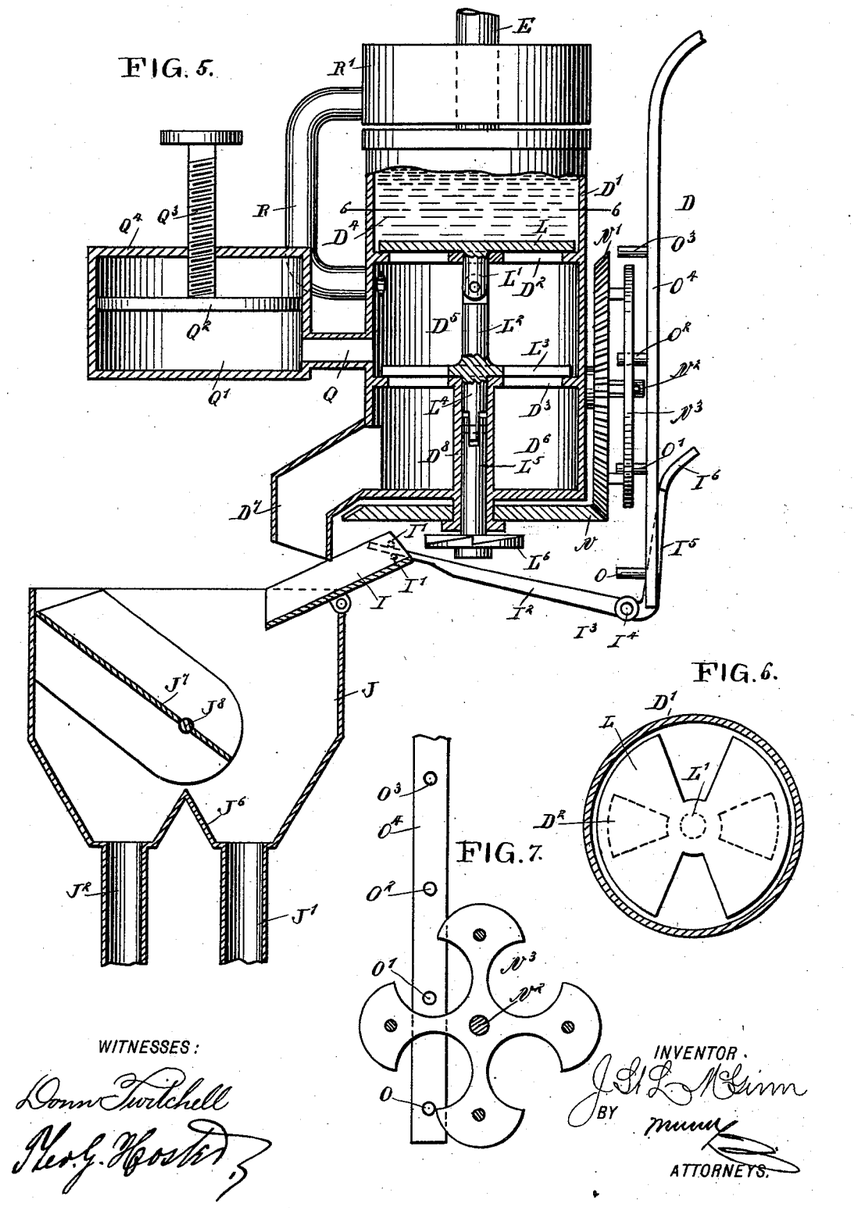
Fig. 5 is an enlarged sectional side elevation of the water-supply device.
Fig. 6 is a sectional plan view of part of the same on the line 6 6 of Fig. 5.
Fig. 7 is a transverse section of the same on the line 7 7 of Fig. 1.
Figure 10:
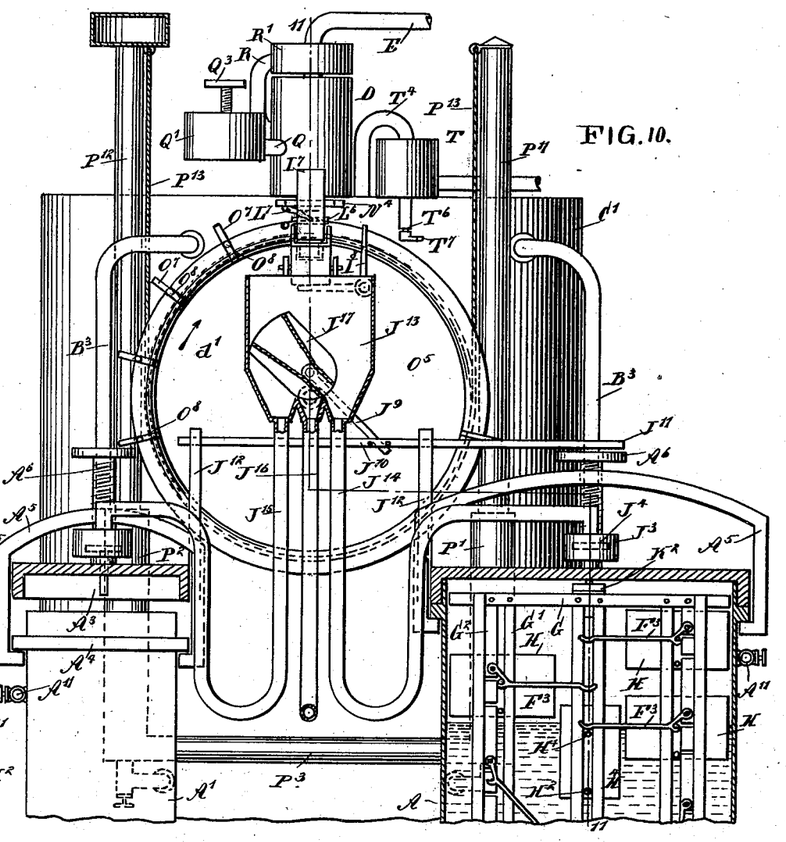
Fig. 10 is a sectional side elevation of a modified form of the improvement.
Figure 11:
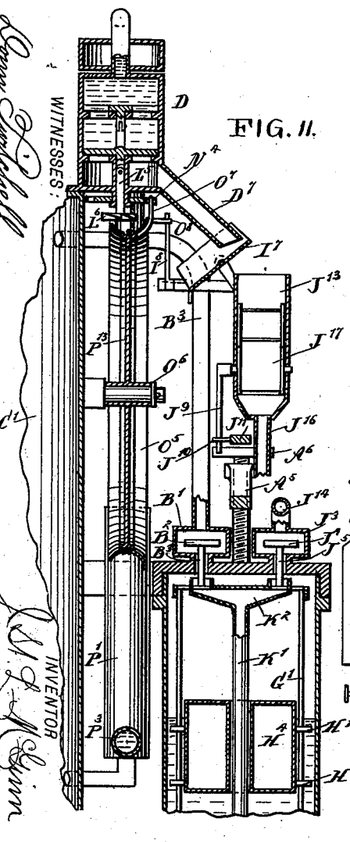
Fig. 11 is a transverse section of the same on the line 11 11 of Fig. 10.

In the modified form shown in Figs. 10 and 11 the controlling device for manipulating the valves L and L³ in the water-measuring device D is somewhat differently constructed; but the result is the same as above described in reference to the construction shown in Figs. 1 and 5. The pipes P¹¹ and P¹² of the controlling device P instead of being connected by a lever P¹⁰ are connected with each other by a rope P¹³, which winds once or twice around a drum O⁵, arranged between the said pipes and journaled on a stud O⁶, carried by the holder C'. Thus the rising of either pipe P¹¹ or P¹² causes a turning of the drum O⁵ and a downward movement of the other pipe P¹² or P¹¹. On the drum O⁵ are arranged spaced pins O⁷, adapted to engage a star-wheel N⁴, which takes the place of the gear-wheel N and is likewise connected by the pawl L⁷ with the ratchet-wheel L⁶, secured to the valve-stem L⁵ of the valve mechanism in the measuring device D. When the drum O⁵ is turned in the direction of the arrow d', the pins O⁷ actuate the star-wheel N⁴ to turn the valve mechanism, and when the drum is rotated in the opposite direction the valve mechanism remains at a standstill, as the pawl L⁷ then glides over the teeth of the ratchet-wheel L⁶, as above explained. The pins O⁷ also actuate the arm T⁷ of the safety device T of the construction previously explained. The chute I⁷ for delivering the water from the measuring device D to the hopper J¹³ is actuated by a second set of pins O⁸ from the drum O⁵. The pins O⁸ extend transversely and are adapted to engage successively one arm of a bell-crank lever I⁸, having its other arm engaging the rear end of the said chute I⁷, so that when the drum is turned in the direction of the arrow d' a pin O⁸ imparts a swinging motion to the bell-crank lever I⁸ to swing the overbalanced chute over to connect the spout D⁷ with the hopper J¹³ for the purpose previously explained.

As shown in Figs. 10 and 11, the hopper J¹³ is provided with three pipes J¹⁴, J¹⁵, and J¹⁶, of which the pipes J¹⁴ and J¹⁵ lead to the generators A A', respectively, and the pipe J¹⁶ leads to a third generator, (not shown,) but like either generator A or A'. The dividing-wing J¹⁷ is arranged to direct the water to any of the three pipes J¹⁴, J¹⁵, or J¹⁶ and for this purpose is formed with a central hopper adapted to connect the chute I⁷ with the middle pipe J¹⁶. The connection of the wing J¹⁷ with the shifting and locking bar J¹¹ is the same as previously described. The water-pipe K' for each generator-casing A² is now arranged in the middle of the casing instead of on one side, as shown in Fig. 1, and this pipe K' forms a guide for the float H⁴ to slide on, as plainly shown in Fig. 11. The upper end of the pipe K' is formed with a funnel K², extending under the inlets of both pipes J¹⁴ and B³, so that water can readily pass into the casing without splashing, it being understood that water can drain down from the pipe B² when the generator has finished generating gas, and its water is to be drained off at the cock A¹¹ previous to removing the casing for refilling the cups.

Having thus fully described my invention, I claim as new and desire to secure by Letters Patent—

1. An acetylene-gas generator comprising a generator-casing, independently-supported calcium-carbid cups in the casing, and a float in the said casing for successively releasing the said cups and carrying the calcium-carbid into the water, substantially as shown and described.

2. In an acetylene-gas generator, the combination with a casing, of a plurality of calcium-carbid cups in the casing and having guided movement therein, and means for engaging the cups to independently support them, said means being disengaged from the cups by the rise of water in the casing, as set forth.

3. In an acetylene-gas generator, the combination with a casing, of a plurality of calcium-carbid cups in the casing and having guided movement therein, means for engaging the cups to independently support them, and a float in the said casing for disengaging the supporting means from the cups, substantially as described.

4. In an acetylene-gas generator, the combination with a casing, of a plurality of calcium-carbid cups in the casing, hooks engaging the cups for supporting them, and a float in said casing and operating to disengage the hooks from the cups, substantially as described.

5. In an acetylene-gas generator, the combination with a casing, of a plurality of calcium-carbid cups provided with projecting pins and having guided movement in the casing, pivoted hooks engaging the pins of each cup, and a float in the said casing and operating to disengage the hooks from the pins of the cups, substantially as described.

6. In an acetylene-gas generator, the combination with a casing, and a frame in the casing and having guideways therein, of a plurality of calcium-carbid cups provided with pins working in the guideways of the said frame, pivoted hooks engaging the pins of the cups to support them, said hooks being provided with extensions, and a float provided with pins working in the guideways of the frame and adapted to engage the extension of the hooks, substantially as and for the purpose set forth.

7. An acetylene-gas generator comprising a generator-casing, independently-supported calcium-carbid cups in the said casing, a float in the casing for successively releasing the said cups and carrying the calcium-carbid into the water, and a water-measuring device for delivering a measured quantity of water into the said casing, to cause the float to rise and release a cup, substantially as shown and described.

8. An acetylene-gas generator comprising a generator-casing, independently-supported calcium-carbid cups in the said casing, a float in the casing for successively releasing the said cups and carrying the calcium-carbid into the water, and a holder into which the generated gas passes from the casing, substantially as shown and described.

9. An acetylene-gas generator comprising a generator-casing, independently-supported calcium-carbid cups in the said casing, a float in the casing for successively releasing the said cups and carrying the calcium-carbid into the water, a holder into which the generated gas passes from the casing, and a water-measuring device controlled by the gas accumulating in the said holder, the device being arranged to deliver a measured quantity of water to the said casing, to cause the float to rise and release a cup, substantially as shown and described.

10. An acetylene-gas generator comprising a generator-casing connected with a water-supply, a frame held in the said casing, a series of calcium-carbid cups fitted to slide in the said frame, and arranged one above the other, hooks carried by the frame and normally supporting the cups in position and spaced apart, and a float in the said casing and arranged to rise with the water accumulating therein, the said float being arranged to trip the said hooks successively and release the cups one after the other, substantially as shown and described.

11. An acetylene-gas generator provided with a generator-casing adapted to contain calcium-carbid cups, a fixed cover for the said casing, and carrying the water-supply pipe and the gas-escape pipe, a clamp for fastening the said casing to the said fixed cover, and a frame movably held in the said casing, and adapted to carry the calcium-carbid cups, the said frame being arranged to keep the valves in the said pipes open during the time the casing is attached to the cover, substantially as shown and described.

12. An acetylene-gas generator provided with a water-feed-controlling device operated by gas-pressure comprising two connected pipes adapted to contain a liquid, holders fitted to slide in the said pipes, and having their lower open ends immersed in the liquid contained in the pipes, a lever for connecting the holder-pipes with each other, and a gas-supply pipe for one of the holder-pipes, and connected with a gas-supply the pressure of which is to be regulated, substantially as shown and described.

13. An acetylene-gas generator provided with a water-feed-controlling device operated by gas-pressure, comprising two connected pipes adapted to contain a liquid, holders fitted to slide in the said pipes, and having their lower open ends immersed in the liquid contained in the pipes, a lever for connecting the holder-pipes with each other, a gas-supply pipe for one of the holder-pipes, and connected with a gas-supply the pressure of which is to be regulated, and a second gas-supply pipe having a valve and connected with the other holder-pipe substantially as shown and described.

14. In an acetylene-gas apparatus, the combination with two generators, and a water-supply hopper connected with the generators, of a dividing-wing pivoted in the hopper, and a sliding rod connected with the pivot of the wing and adapted to be slid alternately over the generators, substantially as and for the purpose set forth.

15. In an acetylene-gas apparatus, the combination with two generators provided with bearings in their covers, and a water-supply hopper connected with the generators, of a dividing-wing pivoted in the hopper, an arm on the pivot of the wing, and a rod sliding in the bearings of the covers of the generators and with which the said arm is loosely connected, substantially as described.

JOHN ST. LEGER McGINN.

Witnesses:
GEO. H. HADSKIS,
JOHN CHAMBERS.